(12) United States Patent
Tsai et al.

(10) Patent No.: US 7,218,752 B2
(45) Date of Patent: May 15, 2007

(54) FEATURE BASED DATA STRUCTURE FOR COMPUTER MANIKIN

(76) Inventors: Ming-J. Tsai, No. 74, Alley 16, Lane 333, Kaiyuan Rd., Tainan (TW) 704; Jing-Jing Fang, F12, No. 296, Dong Ann Rd., Tainan (TW) 701

( * ) Notice: Subject to any disclaimer, the term of this patent is extended or adjusted under 35 U.S.C. 154(b) by 756 days.

(21) Appl. No.: 10/699,640

(22) Filed: Nov. 4, 2003

(65) Prior Publication Data
US 2005/0093858 A1 May 5, 2005

(51) Int. Cl.
*G06K 9/00* (2006.01)
(52) U.S. Cl. .................. 382/100; 345/419
(58) Field of Classification Search ............... 345/419; 382/100; 342/22
See application file for complete search history.

(56) References Cited

U.S. PATENT DOCUMENTS

| | | | | |
|---|---|---|---|---|
| 3,888,020 A | * | 6/1975 | Krause ................... | 434/266 |
| 3,947,974 A | * | 4/1976 | Gordon et al. .......... | 434/266 |
| 4,601,665 A | * | 7/1986 | Messmore ............... | 434/267 |
| 6,968,075 B1 | * | 11/2005 | Chang .................... | 382/111 |
| 7,021,940 B2 | * | 4/2006 | Morris et al. ............ | 434/268 |
| 2006/0066469 A1 | * | 3/2006 | Foote et al. ............. | 342/22 |
| 2006/0267978 A1 | * | 11/2006 | Litke et al. ............. | 345/419 |

OTHER PUBLICATIONS

Using Skin-Color Motion for 3D Face Modeling and Synthesis, Kirl A.Bletsko et al., DEpt of Radiophysics, Byelorussian State University.*

* cited by examiner

*Primary Examiner*—Joseph Mancuso
*Assistant Examiner*—Nancy Bitar
(74) *Attorney, Agent, or Firm*—Bacon & Thomas, PLLC

(57) ABSTRACT

This invention proposes a feature based data structure for computer manikin that is constructed from the scanned data of common 3D body scanners. The scanned data is first segmented into six parts and then encoded into range images. Feature recognition algorithms are developed and coded into computer algorithms. The software system can automatically recognize the important human feature points and feature curves. The computer manikin is constructed based on the interpolation between the feature curves. The manikin has geodetic latitudinal and longitudinal curves that pass through the geometric feature points of human body. The geodetic coordination contains all the important features that can be extracted as needed for apparel or ergonomic design, medical researches, and movie amusement industry.

15 Claims, 7 Drawing Sheets

Flowchart of 3D body scanned data processing.

Flowchart of 3D body scanned data processing.

Search for the armpit by four break points.

(a) Without head            (b) With head

Encoding the torso data points into range image format, after void interpolation.

(a) Aged 45 women      (b) Aged 20 women

Body feature lines searching results.

The inverse of Sobel values for the x-coordinates of front centerline.

(a) original points, (b) fitted and modified, and (c) Top view of the shoulder line.
Search and modify of shoulder line.

Data structure of a typical latitudinal line (the bust line)

(a) front view of neck-should line,       (b) top view, neck line only.

Data structure of neck-shoulder line.

Data structure of the armhole.

Structured points of the 46th (armpit) girth line.

Method to construct the structure points on the shoulder.

(a) Structured data points　　　　(b) Meshed with color rendering
The data structure of the computer manikin in 3D views.

FEATURE BASED DATA STRUCTURE FOR COMPUTER MANIKIN

FIELD OF THE INVENTION

The invention relates generally to a method for finding body features and to construct a data structure for electronic manikin from 3D body scanned data. The manikin has geodetic latitudinal and longitudinal curves that pass through the feature points of human body. The geodetic coordination contains all the important features that can be extracted as needed for apparel/ergonomic design, medical researches, and movie amusement industry.

BACKGROUND OF THE INVENTION 3D body scanning technology has been developed for a long time. However, turning the scanned data into useful information for engineering purposes is still difficult. The problem is due to the raw data containing no useful information. The key points to solve the problem are feature recognition, data extraction, and symbolization. This invention proposes a feature based data structure for computer manikin and the method to construct the manikin from the scanned data of common 3D body scanner.

SUMMARY OF THE INVENTION

This invention proposes a feature based data structure for computer manikin that is constructed from the scanned data of common 3D body scanners. The data set is first adjusted to align its principal axes. A cusp search algorithm finds the armpits and crotch. The body data is then segmented and encoded into six range images. Using the image processing technique, noise points are removed and the voids are filled up.

The descriptions of human features in the literatures and Standard Codes are translated into logical mathematical definitions. A feature recognition algorithm is established to find body feature points and feature curves. The electronic manikin is constructed based on the feature curves thus found. The manikin has geodetic latitudinal and longitudinal curves that passing through feature points of human body. The geodetic coordination contains all the important features that can be extracted as needed. The electronic manikin provides an infrastructure of building an automatic anthropometric system. It also can be used in garment design, medical and ergonomic researches, and movie amusement industry.

REFERENCE WORKS

Figure 1:
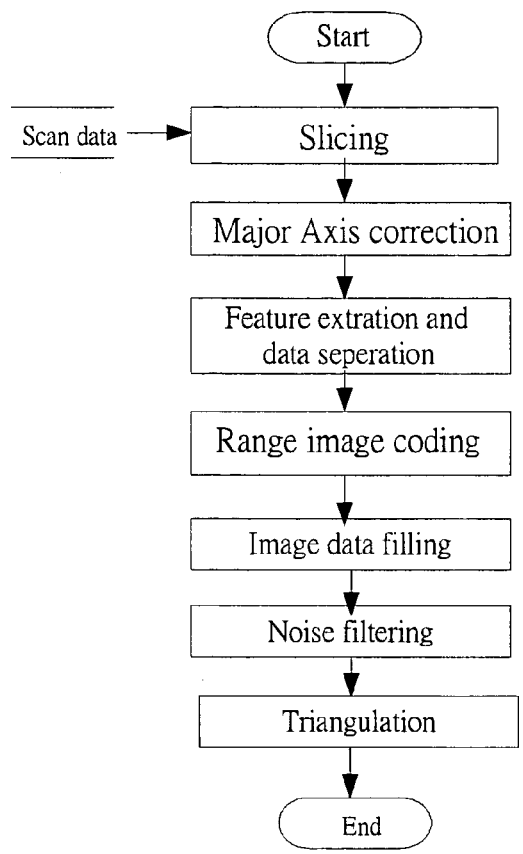
FIG. 1: Flowchart of 3D body scanned data processing.

1. Anand, V. B., "Computer Graphics and Geometric Modeling for Engineers," John Wiley & Sons Inc., U.S.A., 1993.
2. Ashdown, S. and S. Loker, "Use of Body Scan Data to Design Sizing Systems Based on Target Markets", America National Textile Center Annual Repot, 2001
3. ASTM, "Standard Terminology Relating to Body Dimensions for Apparel Sizing," ASTM Designation: D 5219-99, USA, 1999.
4. Au, C. K. and M. M. F Yuen, "Feature-based reverse engineering of mannequin for garment design," Computer-Aided Design, Vol. 31, pp. 751–759, 1999.
5. Buxton, B., Dekker, L., Douros, I., and Vassilev, T., "Reconstruction and interpretation of 3D body surface images," Proc. Numerisation 3D Scanning, May, Paris, 2000.
6. Carrere C., Istool, C., Little, T., Hong, H., Plumlee, T., "Automated garment development from body scan data," National Textile Center Annual Report: I00-S15, Nov. 2000, & 2001, USA.
7. Certain, A. and W. Stuetzle, "Automatic body Measurement for mass Customization of Garments," Procs. Of IEEE Second International Conference on 3-D Digital Imaging and Modeling, pp. 405–412, 1999.
8. Chen, J. C., "Points generating on the indicated segmentation plane from 3D scanner cloudy points", Technical Report, Virtual Reality and Multimedia Lab, Department of Mechanical Engineering, National Cheng Kung University, Taiwan, 2001/11.
9. Cooklin, G., "Pattern grading for women's clothes: the technology of sizing," Oxford: BSP Professional Books, 1990.
10. Cyberware: http://www.cyberware.com.
11. Dekker L., "3D whole body scanned data processing technique, " Workshop on 3D Body Scanning Technique and Application, Center of China Textile Research, July 2000.
12. Gonzalez, R. C. and R. E. Woods, "Digital Image Processing," Addison-Wesley publishing, U.S.A, 1992
13. Hamamatsu: http://usa.hamamatsu.com/sys-industrial/blscanner.
14. International Organization for Standardization (ISO). "Garment construction and anthropometric surveys-body dimensions," Reference No. 8559-1989. Switzerland: ISO., 1989
15. Jones, R. M., Li, P., Brooke-Wavell, K., and West, G. M., "Format for human body modeling from 3D body scanning," International J. of Clothing Science and Technology, 7(1), pp. 7–16, 1995.
16. Ju, X., Werghi, N., and Siebert, J. P., "Automatic Segmentation of 3D Human Body Scans," Proceedings of IASTED International Conference on Computer Graphics and Imaging, 2000.
17. Laszlo, M. J., "Computational Geometry and Computer Graphics in C++" Prentice Hall, Inc., U.S.A., 1996

18. Lee, Y., Terzopoulos, D., and Waters, K., "Constructing physics-based facial models for individuals," Proc. '93 Conference of the Graphics Interface, Toronto, Canada, pp. 1–8, 1993.
19. Nurre, J. H., Connor, J., Lewark, E. A., and Collier, J. S., "On Segmenting the Three-Dimensional Scan Data of a Human Body," IEEE Transactions on Medical Imaging, Vol. 19, No. 8, pp. 787–797, 2000.
20. Paquette, S., Brantley J. D., Corner, B. D., Li, P., and Oliver, T., "Automated extraction of anthropometric data from 3D images," http://arn.iitri.org/docs/scan/systems/paquette.html, 2002
21. Pargas, R. P., N. J. Staples and J. S. Davis, "Automatic Measurement Extraction for Apparel from a Three-dimensional Body Scan," Optics and Lasers in Engineering Vol. 28, pp. 157–172, 1997.
22. Robinette, K., Boehmer, M. and Burnsides D., "3-D Landmark Detection and Identification in the CAESAR Project," Procs. of 3$^{rd}$ International Conference on 3-D Digital Imaging and Modeling, pp. 393–398, 2001.
23. Robinette, K., Daanen, H. and Paquet E., "The Caesar Project: A 3-D Surface Anthropometry Survey," Procs. of IEEE Second International Conference on 3-D Digital Imaging and Modeling, pp. 380–386, 1999.
24. Seitz, T., Balzulat, J., Bubb, H., "Anthropometry and measurement of posture and motion," International Journal of Industrial Ergonomics, 25, 447–453, 2000.
25. Simmons, K. P., "Body Measurement Techniques: A Comparison of Three-Dimensional Body Scanning and Physical Anthropometric Methods," North Carolina State University, Raleigh, N.C., 2001.
26. Solinger J., "Apparel manufacturing handbook: analysis, principles, practice," Columbia, SC: Bobbin Media Corp, 1988.
27. Taylor P. J., Shoben, M. M., "Grading for the fashion industry: the theory and practice," England Thornes, Cheltenham, 1990.
28. Textile Clothing Technology Cooperation: http://www.tc2.com
29. Tsai[a], M. J., Chen, Z. P., Liu, Y. S., "A study on the automatic feature search from 3D body scanners," Proc. of the 20$^{th}$ National Conference, Society of Chinese Mechanical Engineering, Taipei, Dec., 2003.
30. Tsai[b], M. J., Lin, C. C., Jeng, C. L., "The segmentation, encoding and compression of the 3D body scanned data," Proc. of the 20$^{th}$ National Conference, Society of Chinese Mechanical Engineering, Taipei, Dec., 2003.
31. Vitronic: http://www.vitus.de/english/.
32. Wang, C. L., Chang, K. K. and Yuen, M. F., "From laser-scanned data to feature human model: a system based on fuzzy logic concept," Computer-Aided Design Vol. 35, pp 241–253, 2003.
33. Wang, C. L., Wang, Y., Chang, K. K. and Yuen, M. F., "Virtual human modeling from photographs for garment industry," Computer-Aided Design Vol. 35, pp 577–589, 2003.
34. Wang, M. J., Wu, W. Y., Huang, L. K., and Wang, D. M., "Corner detection using bending value," Pattern Recognition Letters, Vol. 16, pp. 575–583, 1995.
35. Zu, B., Huang, W., Chen, T., "Body scanning and modeling for custom fit garments," Journal of Textile and Apparel Technology and Management, 2(2), 1–11, 2002.

DETAILED DESCRIPTION OF THE INVENTION

1. Introduction

Anthropometrics is very important topic on human factor research. Anthropometric data is widely used for human factor designs. For example, the feature dimensions of human body are measured for clothing design. Experienced experts conduct the body measurement. The measured results are subject to the quality of workmanship with personal judgment. The accuracy of the body size depends on the carefulness and the cooperation of the persons during measurement. Recently, 3D body scanner becomes a promising tool for automatic anthropometry. Cyberware (2003), TC$^2$ (2003), Vitronic (2003), Hamamatsu (2003), Certain (1999) are some of the examples. The body scanners are basically optical type that can record huge number of data points without contact the human body. However, the raw data taken from the 3D body scanner contains meaningless information. It needs further processing before it can be used in human factor design, such as data segmentation for significant parts, landmarks or feature points' indication, dimension measurements, etc. Nurre (1997) and Ju (2000) divided the data into sub regions by finding cusp on body scanned data. Carrere et al. (2000, 2001), Dekker (2000), and Pargas (1997) used 3D scanner for anthropometric application in garment industry. Robinette et al. (1999) used 3D body scanner to collect the body dimensions in the Caesar project. They further used neural net to recognize the landmarks and feature points (Robinette, 2001). Ashdown (2001) constructed sizing system using the data form 3D body scanner. Paquette et al. (2002) extracted anthropometric data from 3D images. Simmons 2001) compared different 3D scanners and concluded a standard feature terminology and common feature recognition software is needed for various scanners.

As for manikin construction, human models have been established in a variety of ways: fuzzy logic or gene method (Jones, et al. 1995; Wang, Chang, Yuen, 2003), photograph (Wang, et al., 2003), image process (Lee, et al., 1993), and surface model (Au and Yuen, 1999; Buxton, et al., 2000; Zu, Huang, Chen, 2002) used spline surface to model the human body, but the surface parameters do not highly relate to the human features. All these feature finding and manikin (mannequin) construction algorithms are tedious and difficult in 3D Euclidian space. An efficient and robust algorithm to find body features and construct computer manikin for various 3D body scanner is in a great needed.

This invention proposes a feature based computer manikin that is extracted from the scanned data for 3D body scanners. The raw data from 3D scanners is systematically processed. The body data points are segmented into six regions. Each region is subsequently encoded into a range image format. The body feature points and feature curves are recognized according to the gradient of the gray scale in this particular image format.

The data structure construction of the digital manikin is according to the geometrical feature curves. The manikin has geodetic coordinate which is similar to the longitudinal and latitudinal lines of the Globe. The longitudinal curves include all the feature curves in vertical, whereas the latitudinal curves contain the horizontal feature girth lines of the body. This very concise data structure contains all the features in the torso just like a body atlas that can be readily extracted as needed.

2. Theoretical Background for Feature Recognition

The feature recognition system in this invention is according to the definitions of body feature points and feature lines in the body measurements literatures and Standards. The definitions are translated into logical mathematic definitions, and finally coded into computer algorithm. In this way, the body features can be correctly and uniquely found without ambiguity. The theorem and methodology for feature recognition are primarily based on image process technique (Gonzalez and Woods, 1992), computation geometry (Laszlo, 1996), and computer graphics (Anand, 1993).

The mostly used method is to find the gradient of the gray value in an image. Robert and Sobel masks are the most commonly used. The value of a pixel after the mask convolution is the change of the gray levels between the pixel and its neighbors. In the encoded body range image data, we use the Robert mask to find the noise (isolate) point. The Sobel mask is used to find the gradient of the body surface, such as the centerline (symmetry) of the body. Since the body surface is quite smooth, the length of mask is usually long.

In some cases we use bending value (Wang, 1995) of a curve to detect the feature points. The bending value is used to find the bending point of a curve. This method is very efficiency in computation. It calculates the components of vectors from a point to its precedent and successor points. If the components do not vanish, the point is bending in a curve. We can find the maximum bending point in a portion of a feature curve.

A body feature curve that may pass through some feature points has certain geometric properties. After applying certain mask operator, a series of points can be obtained. The distribution of those points looks like a curve but rather zigzagged. It should be fitted to a continuous curve on the body surface. In this invention, the least squares approximation method is used to find a certain curve having the minimum average distant to those points.

A common problem for optical 3D scanner is that there are voids in the scanned data set. This may be due to line of sight of the equipment is shaded by other part of the body, such as the area in the armpit or crotch, or due to the intensity of reflected light is not strong enough, such as the hair or black object. We have to fill up the data in the void. If the void is small, a linear interpolation between two neighbors can be used. If the void is rather big, or it is located in the relative rough surface, then cubic spline interpolation is necessary to fill up the gap. Cubic spline produces a relative smooth surface because it can take care of the $1^{st}$ st and $2^{nd}$ derivative continuities.

The surface of human body is rather smooth and continuous. A plane passing through feature points will meet the body a smooth curve. The data set obtained from 3D scanner is discrete in nature. A plane through some points on the set generally will neither meet another point nor a curve. However, if the point cloud is dense enough, collecting the points within a distance to the plane becomes a sectional curve (Chen, 2001).

3. The Post-Processing of Scanned Data

To extract features from the body scanned data in 3D space is difficult and time consuming. The purpose of post-processing the raw data is to convert the data into a more meaningful format. The scanned data is first sorted into layers in vertical order. Points in each layer are subsequently sorted by continuity order based on the polar angles. The sagittal plane of the body is found and the data points are transformed into its principal axes. The process also includes the segmentation of the body into six parts, encodes those parts into 2D image format. The flowchart of the post-processes is shown in FIG. 1 (Tsai[b], et al. 2003).

3.1 Segment the Data Points into 6 Sub-sets

Figure 2:
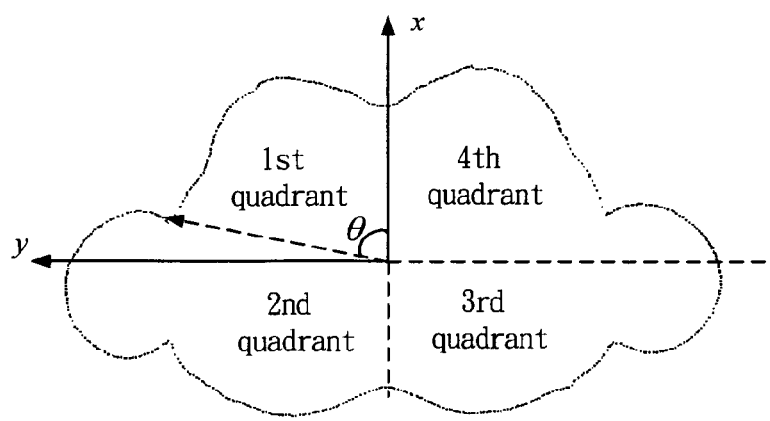
FIG. 2: Search for the armpit by four break points.

According to the geometric features on the body, it is divided into six topological parts: head, torso, two arms, and two legs. This is to reduce the data set for feature recognition. Finding the armpit can divide the arms from the body. However, armpit is not observable by body scanner. We use the four break points at a section that the point data forms four cusps, as shown in FIG. 2. Each one is located in a quadrant divided by sagittal and frontal planes. Bending value method is used to find the break points. The point of the maximum bending value that is greater than a threshold is the break point. Finding the crotch can divide the legs from the torso. The highest cusp between two legs is defined as the crotch. The search of crotch is the same as finding arm break points. Point set beneath the crotch are separated and defined as the legs.

3.2 Encoding the Data Points into Image Format

Figure 3:
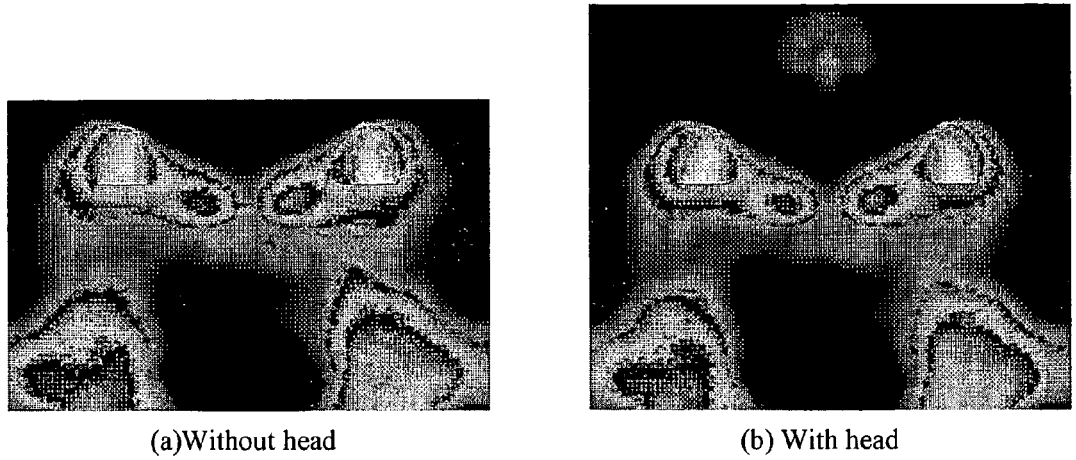
FIG. 3: Encoding the torso data points into range image format, after void interpolation: (a) without head, (b) with head.

The 3D scanned data is encoded into range image format by this invention. The encoded format is compact yet can be efficiently processed by image processing technique. This is to avoid the complexity of management data in 3D format by constructing sculpture surfaces and analyzing the slope and curvature etc. An encoded torso image is shown in FIG. 3 (Tsai[b], et al. 2003). The noise points are removed by Laplace mask. Voids due to shading in the 3D scanner are filled by image processing technique. The file size as well as the process time has been reduced to less than hundredths from its origin.

4. Recognition of Body Features

Figure 4:
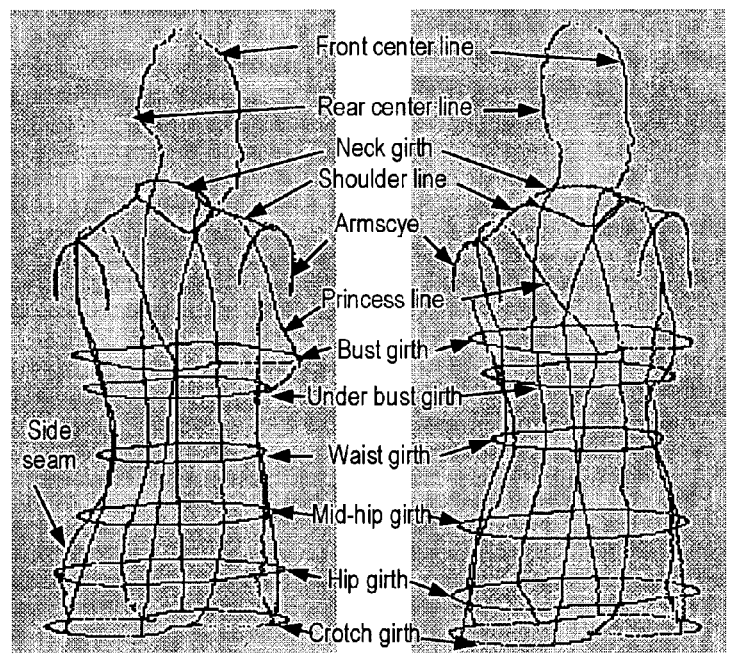
FIG. 4: Body feature lines searching results: (a) Aged 45 women, (b) Aged 20 women.
Figure 5:
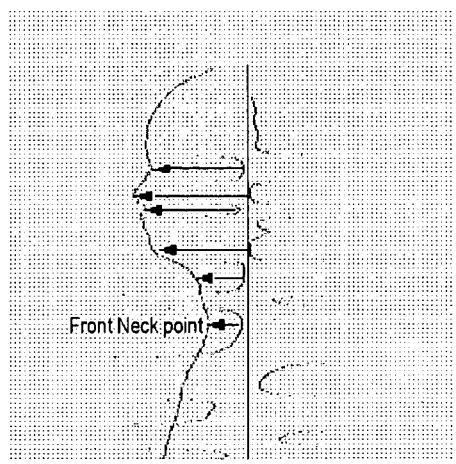
FIG. 5: The inverse of Sobel value for the x-coordinates of front centerline: (a) original points, (b) fitted and modified, and (c) Top view of the shoulder line.

The body feature points search algorithms are based on their mathematic definitions. Unfortunately, there is no unanimity on the definitions of the body feature points in the literatures, Standards, and Codes, let along the logical mathematic definitions (ASTM, 1999; Cooklin, 1990; ISO, 1989; Seitz, Balzulat, & Bubb, 2000; Simmons, 2001; Solinger, 1988; Taylor & Shoben, 1990). This invention converts the definition (descriptions) of feature points in the literature into geometric terms, designs the search algorithms, and writes the computer code so that the feature point can be found automatically (Tsai[a], et al. 2003). The search result is shown in FIG. 4. The search methods for the body feature lines are summary as follows:

1. The front and back centerlines are fitted by vertical lines to the points obtained from zero-crossing points of the torso image by applying Sobel masks twice on the torso.
2. The four princess lines contain two sections. The upper section is sliced from the body data points by a plane passing through the mid-shoulder point, the bust point, and the blade point. The lower section is from the bust (blade) point to the leg front (back) center point.
3. The two sidelines are fitted by a parabolic function to the points obtained from zero-crossing points of the torso image by applying Sobel masks twice on the torso.
4. The neck base girth line is fitted by a smooth curve passing through the front neck point, two side neck points, and the back neck point. The side neck points has the maximum curvature that are the zero-crossing points by applying bending value method on a set points having the maximum y-coordinates in each layer at neck-shoulder data. The front neck point is obtained by Sobel mask on the front centerline, as shown in FIG. 5. The back neck point is obtained by applying Robert mask on the back centerline.

Figure 6:
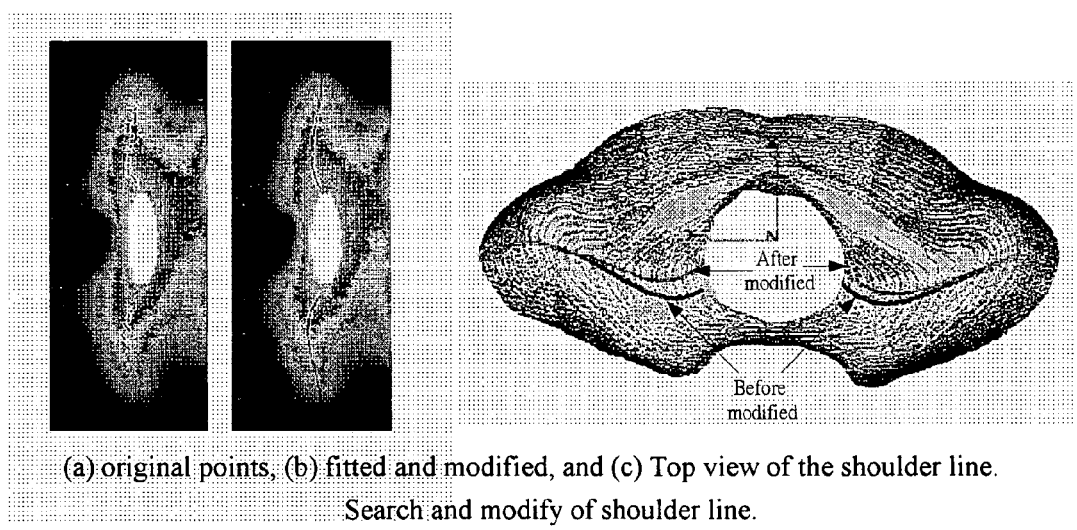
FIG. 6: Search and modify of shoulder line: (a) original points, (b) fitted and modified, and (c) Top view of the shoulder line.

5. The left and right shoulder lines are fitted by smooth curves to the points of zero-crossing points in the shoulder image by applying Sobel masks twice. The starting points and half of the portion of the shoulder lines are smoothly shifted to the side neck point, as shown in FIG. 6.
6. The two armscye girth lines are sliced from the shoulder scanned data set by a plane passing through the shoulder points, front break points, and back break points.
7. The bust line is obtained by a plane slicing the body data set. The plane is perpendicular to the frontal plane and passes through two points, one at the left, and the other on the right, each having the maximum x-coordinate value on the front torso.
8. The under-bust line is a plane slices the body data set through the two points each having the maximum bending value on the front left and right princess lines below the bust level. The plane is also perpendicular to the frontal plane.
9. The positions of hip and the waist are decided by the horizontal histogram of the torso image whose gray values are at the maximum and minimum values, respectively.

5. Data structure for computer manikin

Figure 7:
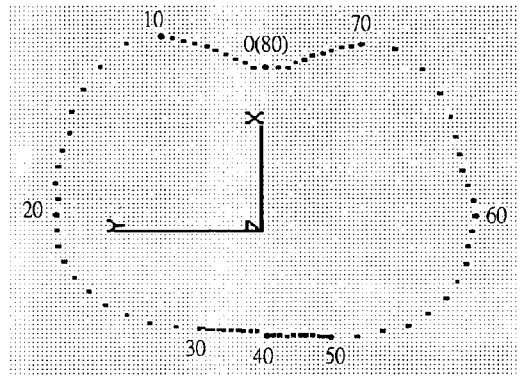
FIG. 7: Data structure of a typical latitudinal line (the bust line).

The feature lines of the body (FIG. 4) can be divided into two categories: eight of them virtually lie horizontally, and another eight vertically. This invention defines a data structure similar to the latitudinal and longitudinal lines of the earth. From the crotch line up to the neck-shoulder line, there are sixty girth lines that include all the eight main feature girths. A typical latitudinal curve (below armpit) has eighty points within which the eight longitudinal feature lines pass through. They are the #0(80), #10, . . . , #60, and #70 points, as shown in FIG. 7. Connecting all the corresponding points of all latitudinal lines forms the eighty longitudinal lines. Likewise, a typical longitudinal line (except the armhole zone) has sixty-one points. Connecting those corresponding points forms a latitudinal line.

According to the geometric complexities, a manikin is divided into three regions to construct the data structure. The A-zone is from neck-shoulder line ($60^{th}$ girth line) to the armpit ($46^{th}$) girth. The B-zone is from the armpit girth to the under-bust ($30^{th}$) girth. The C-zone is from the under-bust girth down to the crotch girth. The methods to construction each zone are illustrated as follows:

5.1 Data Structure of the A-zone

The A-zone of the body is defined between the neck-shoulder line ($60^{th}$ girth) and the armpit ($46^{th}$) girth line. Since the shoulder-neck and armholes should be considered individually for garment design purpose, the geometry of the A-zone is very complicated.

5.1.1 Data Structure of the Neck Base Girth Line

Figure 8:
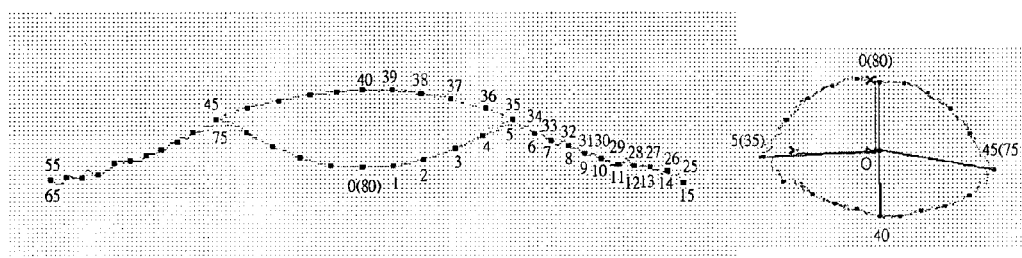
FIG. 8: Data structure of neck-shoulder line: (a) front view of the neck-shoulder line; (b) top view of the neck base line.

Neck base girth line and shoulder lines are at the peak of the torso. FIG. 8(*a*) shows the neck-shoulder line having a total of forty points. The neck base girth line alone is a closed-loop 3D curve inclined from the front neck point and up to the back neck point. The two points are designated as point #0, and #40, respectively on the neck-shoulder data structure. The neck base girth line consists of twenty points (see FIG. 8(*b*)). The left side neck point is the #5 in the front, or identically, #35 in the back. The other structure points are found by dividing the polar angles equally from the centroid of the neck base girth line to the four neck points, projecting them to the horizontal plane. The #1 to #4 points are obtained by interpolating one-fifth of the angle formed by point #0, the centroid, and point #5; so do the points #36 to #39, #41 to #44, and #76 to #79.

5.1.2 Data Structure of the Shoulder Line

The shoulder line starts from the side neck point, through the mid-point of the shoulder to the shoulder point (see FIG. 8(*a*)). The three points (in the front) are designated as #5, #10, and #15 respectively. They are identical to the points #35, #30, and #25, respectively in the back. The points on the shoulder line are all double points because the front part and the back part of the body share the same point at the crest line. The points between #5 and #15 are interpolations of its total lengths between the side neck point and the shoulder point. The #16 to #24 points are omitted due to the armhole. The structure points in the right side of the body are obtained in the same way.

5.1.3 Data Structure of the Armscye Girth Line

Figure 9:
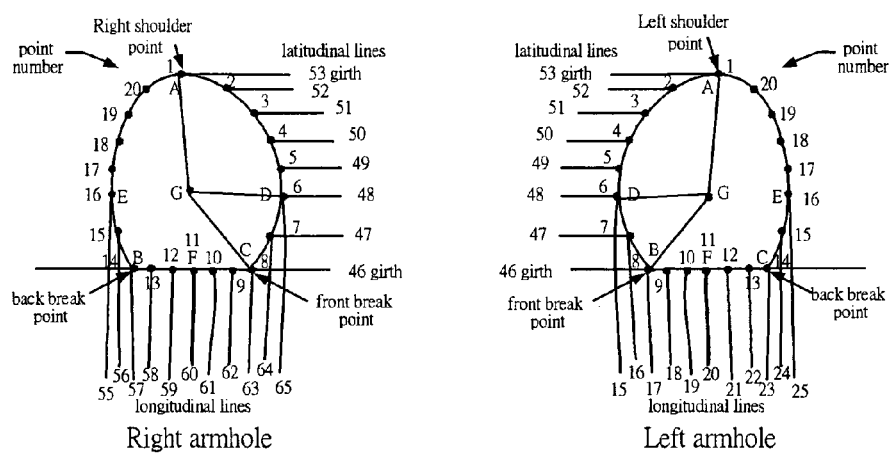
FIG. 9: Data structure of the armhole.

The armscye data set lies in a plane that slices the body through the shoulder point, front break point and back break point. The three points are assigned as #1 (point A), #8 (point B), and #14 (point C), respectively, as shown in FIG. 9, where G is the centroid of the point set. The point with maximum x-coordinate (widest) is the point #6 (point D) and is assigned at the $48^{th}$ girth level. The point at the same level on the back is the point #16 (point E). Dividing $\angle$ BGD into two, the bisector intersects the data set at point #7. Dividing $\angle$ AGD into five equal parts, points #2 to #5 are obtained. Points #9 to #13 are on the $46^{th}$ girth line and will be obtained from the structure of the $46^{th}$ girth line. Points #15 is obtained by projecting points #7 back to the rear part of armhole, and so forth for points #17 to #20.

FIG. 9 also shows that the structure points of armscye girth line are also the ending points of some longitudinal lines. The points #1 to #6 are the last six points (respectively, the $53^{rd}$, $52^{nd}$, . . . , $48^{th}$ points) of the $15^{th}$ longitudinal line. Likewise, the #16 to #20 points are the last six points of the $25^{th}$ longitudinal line. Points #7 to #15 are the end point of the longitudinal lines #16 to #24. The longitudinal lines #17 to #23 terminate at the $46^{th}$ girth, #16 and #24 terminate at $47^{th}$ girth, and #15 and #25 terminate at $53^{rd}$ girth.

5.1.4 Data Structure of the $46^{th}$ (Armpit) to the $53^{rd}$ Girth Line

Figure 10:
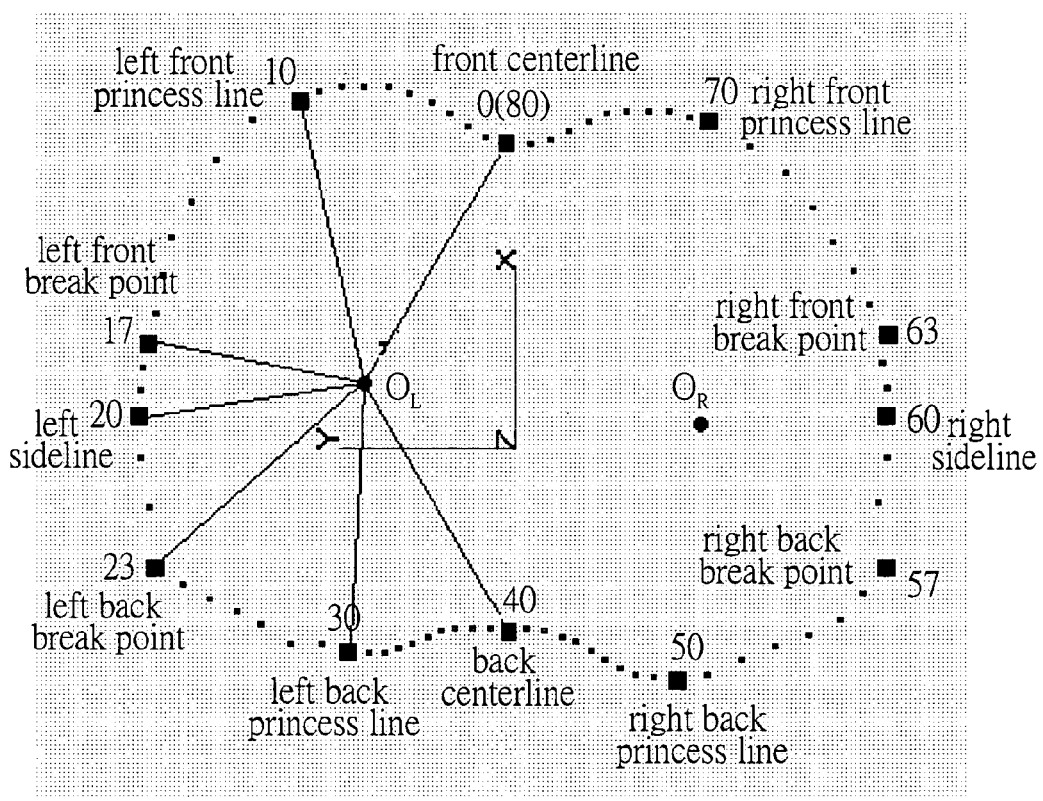
FIG. 10: Structured points of the $46^{th}$ (armpit) girth line.

The body section at the armpit level is assigned as $46^{th}$ girth line, and at shoulder point level is $53^{rd}$ girth. Generally, the right break point is not at the same level of the left break point. Define a sectional plane that slices through the two break points and perpendicular to the frontal plane to get the armpit girth line. The data structure shares some points with armscye girth line's structure. They are the points #17 to #23 at the left and #57 to #63 at the right side, as shown in FIG. 10. The eight longitudinal feature lines passing through the $46^{th}$ girth line at points #0, #10, #20, #30, #40, #50, #60, and #70. The two centroids $O_L$ and $O_R$ are found by the areas enclosed by the left and right sides of the body. Make the angles from the centroid to the eight structure points. All other structure points are obtained from interpolating each corresponding polar angle equally. For example, points #1 to #9 are obtained from interpolating the angle spanned by connecting the left centroid to the points #0 and the point #10. Points #11 to #16 are obtained from the interpolation the angle from point #10 (where front princess line passes) and point #17 (the left front break point). Points #18 and #19 are obtained by dividing the angle between the left front break point and the point #20 (at the side line) into three parts, and so forth for other structure points.

The $47^{th}$ girth line is defined as the body data points that are sliced by a plane passing through the $7^{th}$ points of the left and right armscye girth lines and perpendicular to the frontal (y-z) plane of the body. Since the two sidelines stop at the $46^{th}$ girth level, there are only six longitudinal feature lines passing through this section. The six feature points #0, #10, #30, #40, #50, and #70 are known from the sectional plane intersecting the six longitudinal feature lines. The points #16, #24, #56, and #64 are obtained from the armscye girth line structure. The other structure points can be obtained by interpolation similar to that of the $46^{th}$ girth line. The $48^{th}$ to $53^{rd}$ girth lines have the same structure. They pass through the two armholes. The skipped points are the points #16 to #24, and #56 to #64. The other structure points are obtained using the same manner as the $47^{th}$ girth line.

5.1.5 Data Structure at the Shoulder Neck Area

Figure 11:
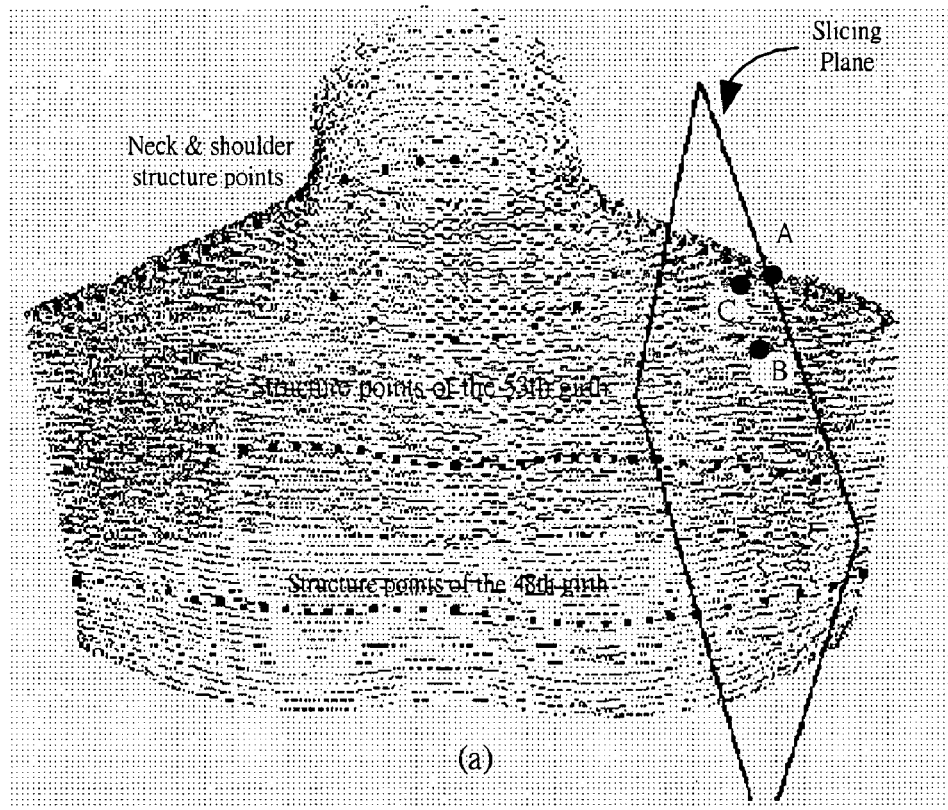
FIG. 11: Method to slice the structure points on the shoulder: (a) slicing, (b) interpolating.
Figure 11:
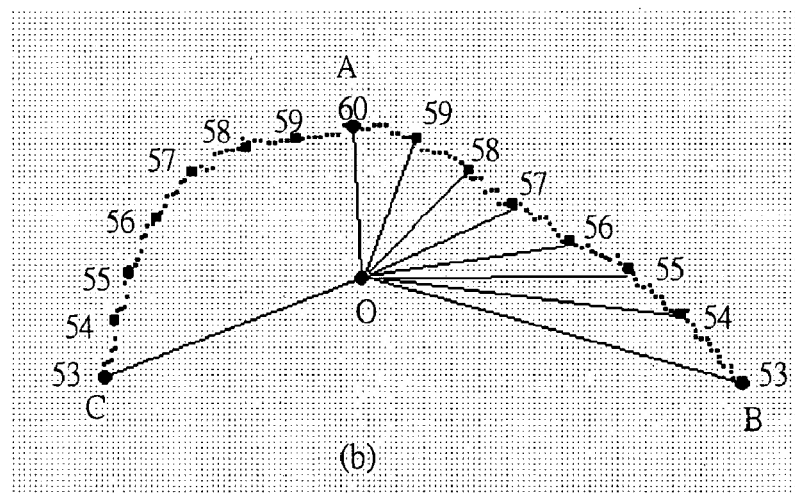

As shown in FIG. 11(a), the data structure of shoulder neck area will be found by slicing the shoulder data set by planes passing through three points: one point (point A) at the $60^{th}$ girth line, and two points (point B, C) with the corresponding point number at the $53^{rd}$ girth line. The plane slices the shoulder data set a curve, as shown in FIG. 11(b). It is generally in a (half) conic shape. Then we find the centroid of the points on the section. If we divide the angle ∠ BOA into seven equal parts, we can obtain points #54 to #59 by interpolation. The structure points of the back part of the shoulder is obtained the same way by dividing the angle ∠ AOC into seven equally spaces. Those structural points are the $54^{th}$ to $60^{th}$ points of the longitudinal lines excepting the armhole regions.

5.2 Data Structure of the B-zone

The B-zone of the body is defined between the armpit level (the $46^{th}$ girth) and the under-bust level ($30^{th}$ girth). The bust line is defined as the $38^{th}$ girth. It is just located at the middle of the B-zone. Basically, the construction of the B-zone data structure has two steps. The first step is to slice the point set between the two levels. The second is interpolating the structure points based on the angle just as other girth line does.

The bust girth line is obtained by slicing a plane that is perpendicular to the frontal (y-z) plane and passes through the two bust points. The eight vertical longitudinal feature lines intersect the slicing plane at the #0, #10, #20, #30, #40, #50, #60, and #70 structure points. Other structural points are obtained using the same method as the $46^{th}$ girth line. FIG. 7 shows a bust girth line.

Divide the height of the left princess line from the under-bust level to the bust level into eight equal parts, and from the bust point to the #10 point of the $46^{th}$ girth line into eight parts. They are the #30 to #46 points on the left princess line (the $10^{th}$ longitudinal line). They are identical to the #10 points on the $30^{th}$ to $46^{th}$ girth lines. Likewise, the same number of points can also be marked on the right princess line at the equal spaces vertically. They are the #30 to #46 points on the $70^{th}$ longitudinal line. Then make the planes that are normal to the frontal (y-z) plane and passes through the two points of the same number on the left and right princess lines. The planes slice the body data set into fourteen girth lines. They are the #31 to #37 and #39 to #45 girth lines. The structure points of each girth line are obtained using the same method as the $46^{th}$ girth line.

5.3 Data Structure of the C-zone

The C-zone of the body is defined between the under-bust level and the crotch level. It includes the crotch, hip, high-hip, waist, and under-bust girth lines. The data structure of the C-zone is designed as the #0 girth at the crotch line, #10 girth at the hip line, #15 at the high-hip line, and #20 at the waistline. The other girth lines among them are obtained by linear interpolation of the height between each pair of feature girth lines. The divisions of the data points in each section planes are virtually the same as other girth lines in the B-zone.

In this invention, we have constructed two waist lines. One is at the level that has the minimum circumference in the C-zone, called the waistline. The position of the waist is decided by the horizontal histogram of the torso image whose gray values are at the minimum value. The minimum circumference may change location when a person gains or losses weight. The waistline then loses its crucial denotation for garment design. For this reason, we find the spinal-waistline instead. The spinal-waistline is found by a plane that slices the body data set horizontally through a point having the maximum bending value on the back centerline within the C-zone level. The back centerline always sticks to the spinal column, and it bends mostly at the waist portion. The spinal-waistline does not change its location due to the change of body shape. Since the spinal-waistline is always lower then the waistline, we designate the spinal-waistline as the #20 girth, and the waistline as the #21 girth.

6. Exposition of the data structure

The data structure is written in a [60, 79] point array according to the C language data format. The array starting from zero so the real dimension is [61, 80], in which there are a total of sixty-one latitudinal lines and eighty longitudinal lines. If any longitudinal line has no sixty-one points, the remaining vacancies are filled with the coordinates of the last point available. The following elucidates the feature lines and feature points in the data structure.

6.1 The Locations of Longitudinal Feature Lines

Front centerline: the #0 longitudinal line; [0, 0~60].

Back centerline: the #40 longitudinal line; [40, 0~60].

Left front princess line: the #10 longitudinal line; [10, 0~60].

Left back princess line: the #30 longitudinal line; [30, 0~60].

Right front princess line: the #70 longitudinal line; [70, 0~60].

Right back princess line: the #50 longitudinal line; [50, 0~60].

Left side line: the #20 longitudinal line; [20, 0~46].

Right side line: the #60 longitudinal line; [60, 0~46].

6.2 The Locations of Latitudinal Feature Lines

Neck base girth line: connecting the last points (#60) of the 0~$5^{th}$, 35~$45^{th}$, and 75~$80^{th}$ longitudinal lines; [0~5, 60]+[35~45, 60]+[75~80, 60].

Shoulder line: connecting the last points (#60) of the 5~$15^{th}$ and 65~$75^{th}$ (or the 25~$35^{th}$ and 45~$55^{th}$) longitudinal lines; left [5~15, 60], right [65~75, 60].

Armpit girth line: connecting the #46 points of all longitudinal lines; [0~80, 46].

Armscye girth line: connecting the last six points of $15^{th}$, $25^{th}$, and the last point of 16~$24^{th}$ (left) longitudinal lines; the last six points of $55^{th}$, $65^{th}$, and the last point of 56~$64^{th}$ (right) longitudinal lines. Left: [15, 53~48]+[16~24, 60]+[25, 48~53]; Right:. [65, 53~48]+[64~56, 60]+[55, 48~53].

Bust line: connecting the #38 points of all longitudinal lines; [0~80, 38].

Under-bust line: connecting the #30 points of all longitudinal lines; [0~80, 30].

Waistline (Minimum circumference): connecting the #21 points of all longitudinal lines; [0~80, 21].

Spinal-Waistline: connecting the #20 points of all longitudinal lines; [0~80, 20].

High-hip line: connecting the #15 point of all longitudinal lines; [0~80, 15].

Hip line: connecting the #10 point of all longitudinal lines; [0~80, 10].

Crotch girth line: connecting the #0 point of all longitudinal lines; [0~80, 0].

6.3 Locations of Feature Points

Left bust point: the #38 point on the $10^{th}$ longitudinal line; [10, 38].

Right bust point: the #38 point on the $70^{th}$ longitudinal line; [70, 38].

Front neck point: the #60 point on the $10^{th}$ longitudinal line; [0, 60].

Back neck point: the #60 point on the $40^{th}$ longitudinal line; [40, 60].

Left side neck point: the #60 point on the $5^{th}$ longitudinal line; [5, 60].

Right side neck point: the #60 point on the $75^{th}$ longitudinal line; [75, 60].

Left shoulder point: the #60 point on the $15^{th}$ (or $25^{th}$) longitudinal line; [15, 60].

Right shoulder point: the #60 point on the $55^{th}$ (or $65^{th}$) longitudinal line; [55, 60].

Left blade point: the #38 point on the $30^{th}$ longitudinal line; [30, 38].

Right blade point: the #38 point on the $50^{th}$ longitudinal line; [50, 38].

Waist front center point: the #20 point on the $0^{th}$ longitudinal line; [0, 20].

Waist back center point: the #20 point on the $40^{th}$ longitudinal line; [40, 20].

Left front break point: the #46 point on the $17^{th}$ longitudinal line; [17, 46].

Left back break point: the #46 point on the $23^{th}$ longitudinal line; [23, 46].

Right front break point: the #46 point on the $57^{th}$ longitudinal line; [57, 46].

Right back break point: the #46 point on the $63^{th}$ longitudinal line; [63, 46].

6.4 Symmetric Data Structure for Garment Design

Figure 12:
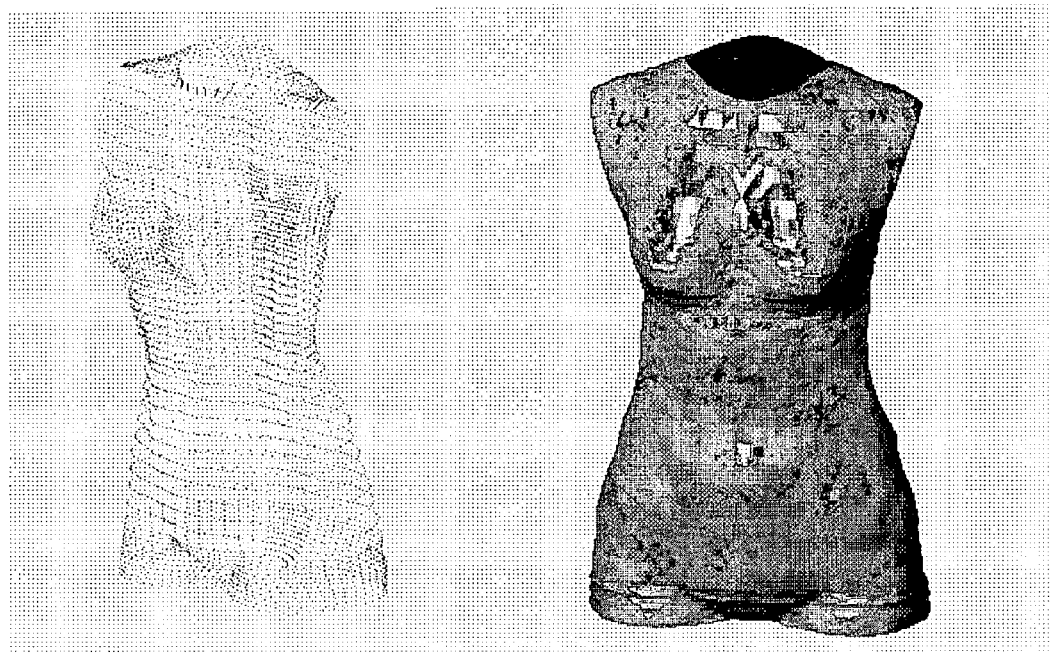
FIG. 12: The data structure of the computer manikin in 3D views: (a) Structure points, (b) Color rendering.

No body is perfectly symmetry. However, tailors need a symmetric manikin to design a garment. When designing a dress for an un-symmetric person, they consider the larger (such as breast) or higher (such as shoulder) side of the body for reference. Therefore, this invention compares which side should be used, and then mirror it to the other side so that the output manikin for garment design is symmetric. In this case, the data structure needs only the half body. It has forty-one longitudinal lines that constitute the left side of the body. Users can simply mirror the left part to the right for a symmetric body data points. The half manikin for garment design has 2363 points. The overall data structure of the torso has 4665 points. Table 1 lists the number of the data points in each longitudinal line of the half body. FIG. 12(a) shows the structure points of a woman, and (b) in color rendering.

7. Importance of the Data Structure

This invention provides a method to convert the body-scanned data into digital manikin. The size of the data can be reduced to hundredth of its original size while maintains the required precision. The geodetic longitudinal and latitudinal coordinates symbolize the geometric locations of the body. The data structure of the digital manikin is very compact yet includes all body feature lines and feature points. Every geodetic coordinate has its own geometrical meaning that represents a special body portion. It is ready to be extracted for design purpose. For example, the torso data structure can be used to generate a base garment by a suitable offset from the data points. The neck base girth line can be used for the collar design of the garment, whereas the armscye girth line can be used to design the sleeves.

The conventional design concepts of apparel and human factor design are based on body dimensions for thousands of years. Pattern maker should try several times before he/she can fabricate a fitted dress. Although the body dimensions can be obtained simply from the data structure, the data structure contains the 3D shape of the body instead of the body dimensions. The 3D digital manikin fertilizes a new design method that the designers can intuitively manipulate the 3D shape rather then just try and error on the body dimensions in 2D patterns. The revolution of the real 3D design concept is waiting for the talents who can fully make use of the data structure. The data structure of the manikin is quite compact and meaningful that can be used as the standard human body data exchange format for various platforms, not only for the human factor design, but also for the movie, medical and amusement industries.

TABLE 1

Data structure of left half body (#0 to #40 longitudinal line)

| Line # | Points | Line # | Points | Line # | Points | Line # | Points |
|---|---|---|---|---|---|---|---|
| 0 | 61 | 11 | 61 | 22 | 47 | 33 | 61 |
| 1 | 61 | 12 | 61 | 23 | 47 | 34 | 61 |
| 2 | 61 | 13 | 61 | 24 | 48 | 35 | 61 |
| 3 | 61 | 14 | 61 | 25 | 54 | 36 | 61 |
| 4 | 61 | 15 | 54 | 26 | 61 | 37 | 61 |
| 5 | 61 | 16 | 48 | 27 | 61 | 38 | 61 |
| 6 | 61 | 17 | 47 | 28 | 61 | 39 | 61 |
| 7 | 61 | 18 | 47 | 29 | 61 | 40 | 61 |
| 8 | 61 | 19 | 47 | 30 | 61 | | |
| 9 | 61 | 20 | 47 | 31 | 61 | | |
| 10 | 61 | 21 | 47 | 32 | 61 | | |

We claim:

1. A feature based data structure for computer manikin comprising:

a multiple geodetic longitudinal feature lines including the main vertically directed feature lines, interpolating between any two neighboring main feature lines;

the multiple geodetic longitudinal feature lines containing the front centerline, left front princess line, left sideline, left back princess line, back centerline, right back princess line, right side line, and the right front princess line;

the multiple geodetic latitudinal feature lines including the main horizontally directed girth lines, interpolating between any two neighboring main girth lines;

and main latitudinal feature lines containing shoulder-neck line, armpit girth line, bust line, under-bust line, waistline, spinal-waistline, high-hip line, hip line, and the crotch girth line.

2. The feature based data structure for computer manikin as claimed in claim 1, wherein the data structures of latitudinal feature lines have eighty points within which eight longitudinal feature line pass through;

and the other points on the girth line are obtained by interpolating the polar angles from the left or right centroid to the neighboring feature points.

3. The feature based data structure for computer manikin as claimed in claim 1, wherein the front and back centerlines are fitted by vertical curves to the points obtained from zero-crossing points of a torso image by applying Sobel masks twice on the torso image.

4. The feature based data structure for computer manikin as claimed in claim 1, wherein the four princess lines and the data structure contain two sections;
the upper section is sliced from the body data points by a plane passing through the mid-shoulder point, the bust point, and the blade point;
the lower section is from the bust point to the leg back center point,
the other structure points between these two sections are obtained from slicing the body by a plane through the two points and the centroid of the girth line.

5. The feature based data structure for computer manikin as claimed in claim 1, wherein the two sidelines stop at the armpit girth lines;
and the data structure of the two sidelines has multiple points that are linear interpolated between the heights of two neighboring main girth lines from the crotch girth line to the armpit girth line.

6. The feature based data structure for computer manikin as claimed in claim 1, wherein the neck base girth line is fitted by a smooth curve passing through the front neck point, two side neck points, and the back neck point;
and the data structure consists of multiple points that are interpolated according to the polar angles spanned by the centroid to the four feature points of the neck base girth line projecting on the horizontal plane.

7. The feature based data structure for computer manikin as claimed in claim 1, wherein the left and right shoulder lines are fitted by smooth curves to the points of zero-crossing points in the shoulder image by applying Sobel masks twice;
wherein the starting points and half of the portion of the right and left shoulder lines are smoothly shifted to the side neck point;
and the mid-shoulder point is set at the middle length of the shoulder line.

8. The feature based data structure for computer manikin as claimed in claim 1, wherein the two neighboring main girth lines are armscye girth lines and are sliced from the shoulder scanned data set by a plane passing through the shoulder points, front break points, and back break points;
and the data structure has multiple points interpolated the polar angles spanning by the centroid of armhole from shoulder point to the front break point, then to the back break point, and back to the shoulder point; and the
side line meets the armscye girth line at the middle of the bottom level; the widest level of the armhole is found, and set at the 48.sup.th girth level that separates the armhole into upper part and lower part.

9. The feature based data structure for computer manikin as claimed in claim 1, wherein the bust line is obtained by a plane that slices the body data set; wherein the plane is perpendicular to the frontal plane and passes through two points, one at the left, and the other on the right, each having the maximum x-coordinate value on the front torso image.

10. The feature based data structure for computer manikin as claimed in claim 1, wherein the under-bust line is a plane slices the body data set through the two points each having the maximum bending value on the front left and right princess lines below the bust girth line and above waist girth line, including the segmentation plane that is perpendicular to the frontal plane.

11. The feature based data structure for computer manikin as claimed in claim 1, wherein the positions of hip and the waist are decided by the horizontal histogram of the torso image whose gray values are at the maximum and minimum values, respectively.

12. The feature based data structure for computer manikin as claimed in claim 1, wherein the spinal-waistline is found by a plane that slices the body data set horizontally through a point having the maximum bending value on the back centerline between the bust and crotch girth lines.

13. The feature based data structure for computer manikin as claimed in claim 1, wherein the high-hip line is found by a plane that slices the body data set horizontally through a point having the maximum x-coordinates and is the zero-crossing point by applying Sobel masks twice on the of the front centerline between the bust and the crotch girth lines.

14. The feature based data structure for computer manikin as claimed in claim 1, wherein the crotch line is found by a plane that slices the body data set horizontally through the crotch point.

15. The feature based data structure for computer manikin as claimed in claim 1, wherein the data structure of computer manikin for garment design recodes only left half part of the manikin; and obtaining data points by computing the gray scale histograms of left and right body images individually, selecting the larger one, and if the right side is select, mirroring it to the left.

* * * * *